Figure 1:
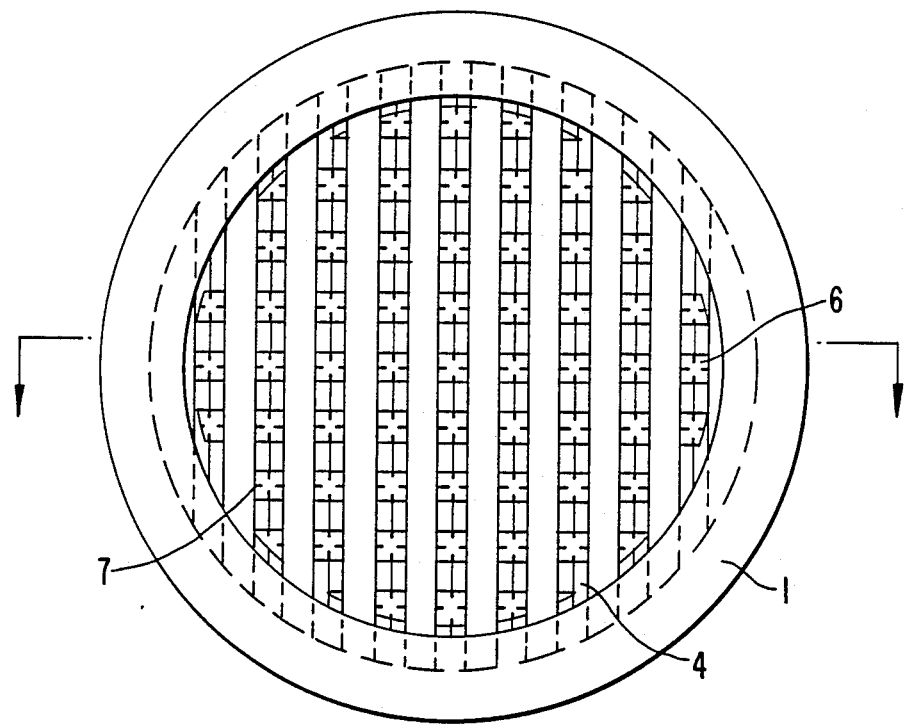

United States Patent [19]
Gasper et al.

[11] Patent Number: 4,870,045
[45] Date of Patent: Sep. 26, 1989

[54] HIGH-TEMPERATURE RESISTANT MOLDED CATALYSTS AND PROCESS FOR THEIR PRODUCTION

[75] Inventors: Bertram Gasper, Troisdorf-Spich; Karlheinz Neuschaffer, Leichlingen; Paul Spielau, Troisdorf-Eschmar, all of Fed. Rep. of Germany

[73] Assignee: Dynamit Nobel Aktiengesellschaft, Troisdorf, Fed. Rep. of Germany

[21] Appl. No.: 76,767

[22] Filed: Jul. 23, 1987

[30] Foreign Application Priority Data

Jul. 23, 1986 [DE] Fed. Rep. of Germany ....... 3624934

[51] Int. Cl.$^4$ .................. B01J 21/00; B01J 35/04
[52] U.S. Cl. ..................... 502/232; 502/238; 502/263; 502/439; 502/527
[58] Field of Search ............... 502/232, 238, 263, 409, 502/439, 527

[56] References Cited

U.S. PATENT DOCUMENTS 2,786,038  3/1957  Talalay ............................. 502/439
3,255,027  6/1966  Taksma ............................ 502/439
4,381,970  5/1983  Craig et al. ...................... 502/527
4,668,659  5/1987  Engels et al. .................... 502/439

Primary Examiner—Carl F. Dees
Attorney, Agent, or Firm—Antonelli, Terry & Wands

[57] ABSTRACT

A molded catalyst has a catalyst material homogeneously distributed in an inorganic molding or a catalytic material anchored on the surface of molding is produced from a flowable molding composition made up of (a) an oxide mixture with contents of amorphous $SiO_2$ and aluminum oxide and/or
(b) electrostatic precipitator ash from high-temperature coal-burning power plants and/or
(c) calcined ground bauxite, as a reactive, finely divided component, and an alkali silicate solution as well as optionally finely divided fillers, by casting into a mold or, respectively, by pressing or preferably extrusion and hardening of the molding composition at temperatures of 50°–95° C. Removal of water at 100°–550° C. is possible, as well as baking at temperatures of up to 1,500° C.

23 Claims, 5 Drawing Sheets

U.S. Patent  Sep. 26, 1989  Sheet 1 of 5  4,870,045

HIGH-TEMPERATURE RESISTANT MOLDED CATALYSTS AND PROCESS FOR THEIR PRODUCTION

This invention relates to a catalyst having catalyst material homogeneously distributed in a support, and to a catalyst having a catalyst material on the surface of a support in the shape of, in particular, hollow bodies, honeycomb structures, or optionally granules, said support being formed from an inorganic molding composition which is self-hardening or is hardened at low temperatures. The invention furthermore concerns a process for shaping a molded catalyst from a hardenable molding composition into the heat-resistant moldings with a material contained therein and/or with the catalyst material being subsequently applied to the surface.

The molded catalysts are suitable for all purposes for which the respective catalyst is intended. Large-format catalyst moldings containing essentially parallel hollow channels constitute a special aspect of the invention. These catalysts are suitable, for example, for denitration, i.e. for the removal of nitrogen oxides from combustion waste gases of power plants or engines.

According to the state of the art, ceramic or metallic moldings are used that usually have an intermediate layer (wash coat) for surface enlargement and that are doped with suitable catalysts i.e. catalytically active materials for influencing chemical reactions. Catalysts containing noble metal as a catalyst material are utilized, above all, for the simultaneous removal of nitrogen oxides, carbon monoxide and residues of hydrocarbons in automobile vehicle engines wherein the noble metals are arranged on the surface of hollow bodies with the aid of an intermediate layer of $Al_2O_3$. Catalysts based on oxides or sulfides of the metals vanadium, molybdenum, tungsten, copper, nickel, cobalt, iron, titanium, zirconium, cerium, or the rare earth metals, as well as mixed catalysts from these metals with contents of aluminum or silicon are used on supports or without support in stationary internal combustion engines or in combustion-type power plants, wherein ammonia must be added in an at least equivalent amount to the nitrogen oxides (German Pat. No. 2,434,416). Also molecular sieves can be used as catalysts. There is the drawback of the necessity of using considerable amounts of ammonia as the nitrogen oxide reducing agent.

Conventional catalyst supports consist, for example, of ceramic compositions obtaining the required strength only by a baking process at temperatures of at least 800° C., in most cases 1,100°-1,200° C. Other support materials are substances hardening like cement, graphite, oxides, sintered glasses, zeolites, or the like, which obtain the required strength by melting, sintering, or by hardening components and which retain the given shape during use. Molded catalysts for use at high temperatures, however, show adequate long-term stability only if high-temperature resistant materials are used in difficult shaping procedures, or if ceramic substances are employed which require high baking temperatures or particularly expensive manufacturing methods. The production of large-size catalysts with hollow channels contained therein is especially difficult.

Therefore, an object of the present invention resides in producing molded catalysts, the support materials of which permit suitable shaping into hollow bodies or optionally granules and which exhibit adequate strength and heat resistance at high temperatures. Furthermore, an object of the present invention resides in producing a catalyst, arranged in ready-for-use form on supports or within supports, in an active condition and with suitability for long-term usage at high temperatures, in a simple way, with simple molding procedures, and from readily accessible starting materials.

These objects are attained by the present invention by providing a molded catalyst, wherein unique inorganic materials are used as supports for the catalyst materials.

The present invention is directed to molded catalysts, comprising a catalyst material homogeneously distributed in an inorganic molding or a catalyst material applied to the surface of an inorganic molding; the molding being produced from a press-moldable or flowable molding composition of (a) an oxide mixture containing amorphous $SiO_2$ and aluminum oxide; and/or (b) electrostatic precipitator ash from high-temperature coal-burning power plants and/or (c) calcined ground bauxite, in amounts of 0.5–4.0 parts by weight of at least one of the finely divided components (a) through (c) per part by weight of an alkali silicate solution containing 1.2–2.5 moles of dissolved $SiO_2$ per mole of $K_2O$ or, respectively, $Na_2O$, and, optionally, finely divided fillers, by pouring the composition into a mold or, respectively, press-molding or extruding and hardening of the molding composition into moldings at temperatures of 50°–95° C.

In particular, it is possible according to this invention, and constitutes a preferred feature, to perform baking of the molding, i.e. the initially molded product, at temperatures of 600°–1,550° C. after hardening at 50°–95° C. and optionally after a temperature treatment at 100°–550° C. in order to remove water, whereby the hardness and in some cases the strength of the moldings are considerably increased.

It is surprisingly possible to incorporate the catalyst material or a precursor material of the catalyst material into the molding by addition into the molding composition without impairing the effectiveness of the catalyst. By means of the molding being formed from the molding composition by self-hardening at low temperatures, it is possible to impart to the molded catalyst the desired shape, especially that of a molding with hollow channels. The alkaline molding composition also makes it possible to produce molded catalysts as foam material by adding amorphous metals, such as, in particular, aluminum as a powder. The novel inorganic molding composition permits production, by self-hardening properties of components (a) to (c), together with the alkali silicate solution, of hard and long-life moldings by hardening at low temperatures, which moldings serve as catalyst supports that show low shrinkage and maintain an intended shape accurately.

The thus-produced molding can be freed of unbound water at 100°–550° C. or optionally at higher temperatures. It is possible, if desired by treatment with gases, such as NO, NO/CO, oxygen, hydrogen, or the like, at elevated temperatures, e.g. in the range from 150° to optionally 1,200° C., to activate the catalyst material and/or to form the catalyst material from catalyst precursor materials. The molded catalysts are suitable—as far as determinable—for catalytic processes of all kinds and in many cases possess inherent catalytic activity. By means of foam pores or cavities, the molded catalysts can be designed to be penetrable by gases or absorptive for gases or liquids; in this connection, the entire required temperature range of usage, from arbitrarily low temperatures up to the softening temperature of the support or of the catalysts can be exploited. Temperature-sensitive catalyst material, i.e. catalytic elements and/or compounds, can likewise be incorporated into the catalyst or can be applied to the surface, since the molding composition is hardenable at as low as 100° C. or, if necessary, already at room temperature.

In an especially advantageous way, anchoring of the catalyst material on the surface of a granulated material or in hollow channels of the molding is also possible; for this purpose, the same molding composition, with a sufficiently large amount of the catalyst material distributed therein, is applied to the surface in the form of a slurry or with the aid of the aforementioned wash coat, and is optionally hardened.

Although one of the inventors of the present invention has already suggested an exhaust gas catalyst support from a similar molding composition, according to German Patent Application P 35 12 586 (corresponding to U.S. Pat. No 4,668,659), purely a support is involved in this earlier disclosure which, due to the application of noble metals to the surface, is of a different character and wherein the hollow channels are produced in a different way by reaction of aluminum with the alkali of the molding composition.

The molded catalysts of the present invention generally contain 0.001–80 parts by weight, preferably 0.5–25 parts by weight of a catalyst material, based on the weight of the moldings. The external shape of the moldings can be adapted to the intended use of the molded catalysts. Preferably, the moldings can contain hollow channels arranged essentially in parallel to one another. Furthermore, 0.1–70 hollow channels per cm$^2$ of cross-sectional surface area are preferably provided. The moldings can also consist of tubular sections arranged in parallel to one another. Furthermore, the moldings can be utilized in the form of a loose bulk of granules, pellets, rings, or the like. In particular, the provision is made to produce from the molding composition, by way of rod extrusion, molded articles containing hollow channels which are optionally subdivided by webs, exhibiting the external dimensions of squares with pairs of parallel surfaces, which squares are piled up in rectangular chambers practically without any gaps and exhibit the lowest flow resistance. It is likewise possible to manufacture moldings having the external shape of cylinders.

The moldings, after hardening, attain flexural strengths at break in the range from 10 to 35 N/mm$^2$ or, in some cases, even higher. The tendency toward crack formation or mold shrinkage is extremely low.

The molded catalysts can, if desired, contain foam pores. In this case, the molding composition is combined with gases or preferably with gas-forming materials, for example peroxides, such as perborate, organic peroxides or $H_2O_2$ with decomposition temperatures of between room temperatures and the hardening temperature. It is also possible to add fine aluminum powder. Open foam pores can be obtained by performing the expansion step in the still liquid catalyst composition and forming, by a vacuum treatment prior to hardening, spongy micropores or fine hollow channels.

The molding composition contains an especially firm reaction component as a component having lithogenous activity with the alkali silicate solution; this component must be selected from special materials. The following solid, lithogenous reaction components can be utilized.

Suitable is an oxide mixture of amorphous $SiO_2$ and aluminum oxide obtained as furnace filter dust from the manufacture of corundum or mullite, with contents of amorphous $SiO_2$ of 7–75% by weight and mostly crystalline $Al_2O_3$ in amount of 12–87% by weight, and small concentrations of additional components. Furthermore, another suitable component is calcined bauxite containing 0–30% by weight of $SiO_2$ and 50–70% by weight of $Al_2O_3$, besides proportions of other oxides, especially iron oxide, dependent on origin. Furthermore, another suitable component is electrostatic precipitator ash produced during dust-like precipitation into the electrostatic filter of high-temperature coal-burning power plants with combustion chamber temperatures of above 1,600° C. Electrostatic precipitator ash of this type is glassy-amorphous and contains 45–55% by weight of $SiO_2$ as a glass besides $Al_2O_3$ and in some cases 8–11% by weight of $Fe_2O_3$.

The alkali silicate solution is a sodium silicate solution or, very preferably, a potassium silicate solution having a molar ratio of $SiO_2:K_2O$ or $Na_2O$ of 1:0 to 2.5:1, prepared from alkali water glass or preferably solid or dissolved alkali hydroxide and amorphous precipitated $SiO_2$ with solids contents of about 35–65% by weight. Fillers can be utilized in finely ground form in amounts of 0.5–6 parts by weight per part by weight of the solid reaction component.

Examples of suitable fillers are quartz powder, quartz sand, aluminum oxide, aluminum hydroxide, magnesium oxide or hydroxide, talc, or other inert materials, as well as electrostatic precipitator ash or calcined bauxite which show inert behavior in excess quantities. Generally, the filler content ranges from 10–50% by weight.

The molding composition is prepared, for example, by mixing the finely ground, solid ingredients of the molding composition and of the catalyst material and-/or its precursor material in finely divided form with the alkali silicate solution, optionally additional amounts of alkali and, if desired, water under agitation or kneading, cooling being required in some cases.

The water content is dependent on the type of processing intended and is generally so high that free flowability has just about been obtained, in case of casting into molds, or flowability or extrudability of the molding composition in the respective mold units has been reached. Water contents of 20–65% by weight are acceptable. The molding compositions have the property of solidifying into moldings during the shaping step in a short period of time after cessation of agitation or force application, the firmness of these moldings being initially sufficient for removal from the mold, until the actual hardening step takes place by the effect of temperature or even merely by allowing a spontaneous hardening process to take place.

The molded catalysts are produced according to conventional methods, such as casting, press-molding, stamping, or extrusion. In this connection, a molded catalyst is preferred which has parallel hollow channels, the number of which amounts, in dependent on the usage purpose, in case of automobile exhaust gas catalysts to 20–100 cm$^2$ of cross-sectional area, and in case of power plant waste gas catalysts to 1–500/100 cm$^2$ of cross-sectional area. Manufacture takes place preferably by extrusion of the molding composition with the use of a suitable extrusion die into moldings having parallel hollow channels. A casting mold is preferably employed if a porous structure is to be present in the catalyst.

Figure 2:
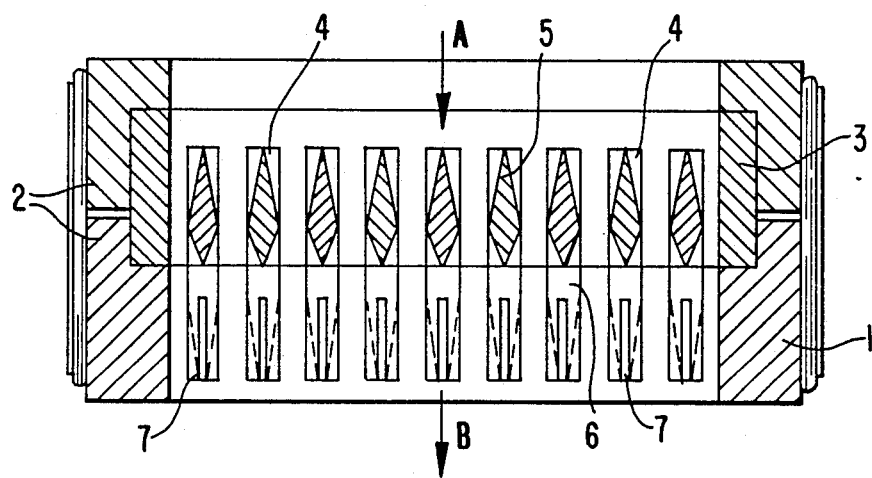
Figure 3A:
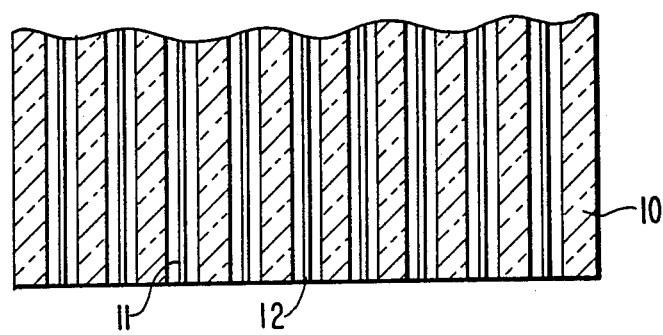
Figure 3B:
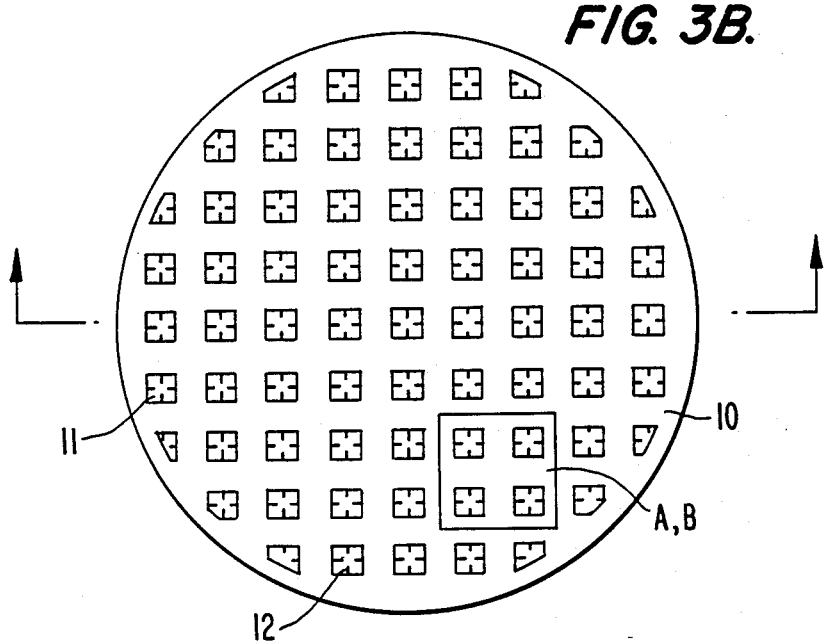
Figures 4A, 4B:
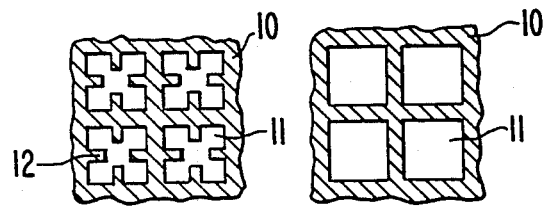
Figure 5A:
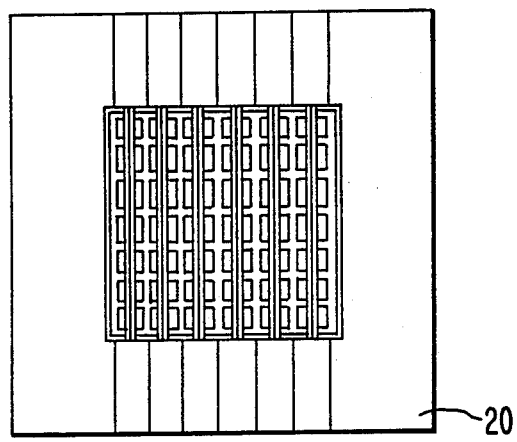
Figure 5B:
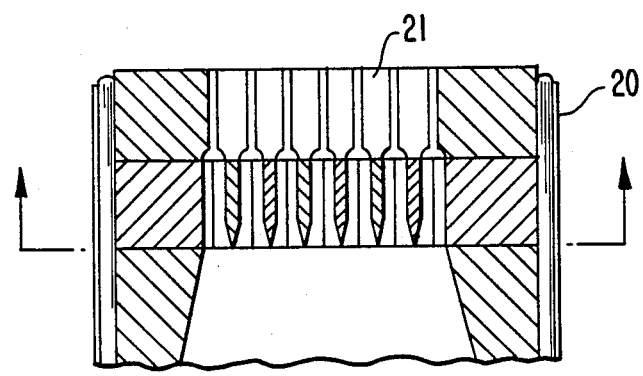
Figure 5C:
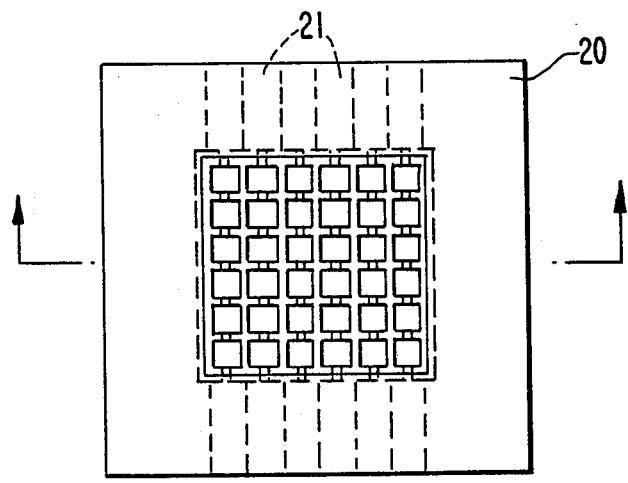
Figure 6A:
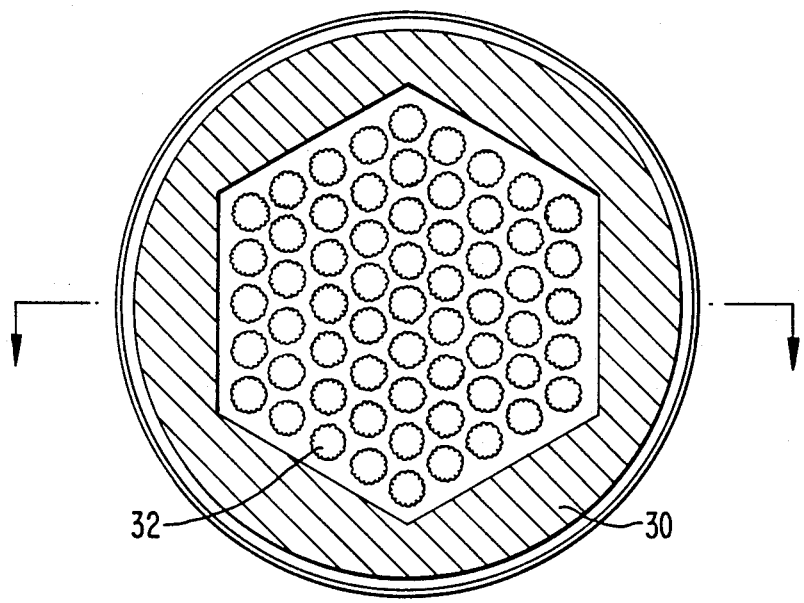
Figure 6B:
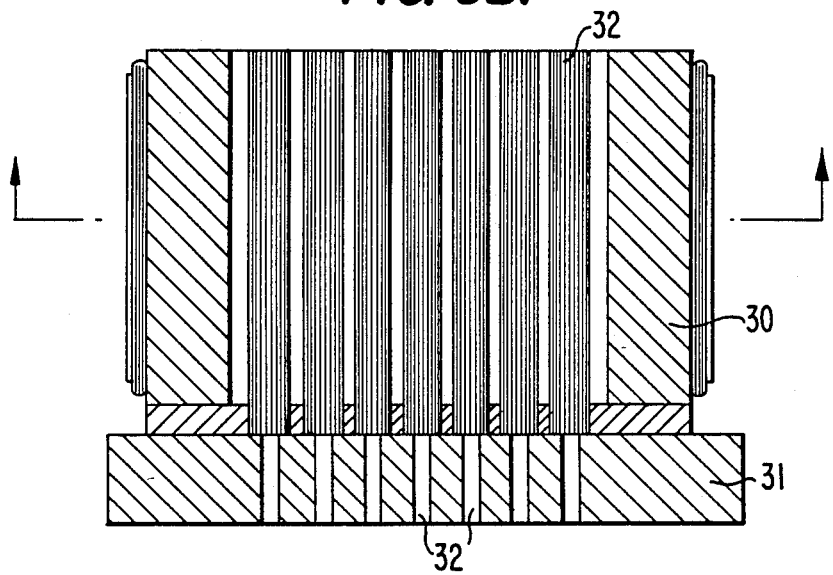
Figure 7A:
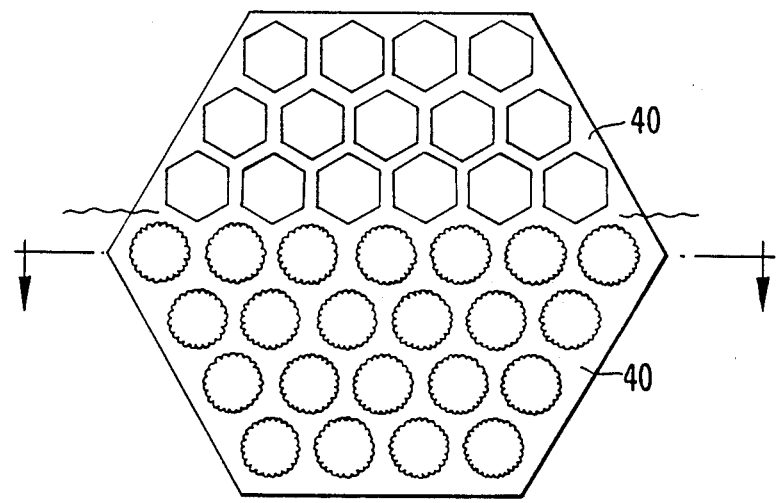
Figure 7B:
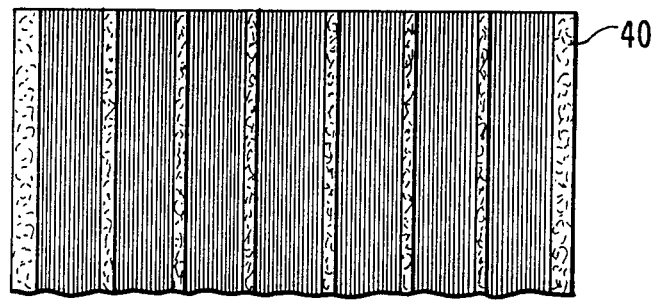

The production of molded catalysts according to the invention will be described in greater detail below with reference to the figures wherein:

FIG. 1 shows an extrusion die in ribbed construction;
FIG. 2 shows a section through an extrusion die according to FIG. 1;
FIG. 3 shows a section through a molded catalyst;
FIG. 4 is a view of a molded catalyst with details A and B;
FIG. 5 shows an extrusion die in disk-type construction;
FIG. 6 shows a casting mold; and
FIG. 7 shows a molded catalyst produced by casting.

In the production of molded catalysts by extrusion, an extrusion die is preferred as shown in FIGS. 1 and 2. The extrusion die 1 consists of the bipartite base members 2, the rib mounting 3 and the ribs 4. The ribs 4 are inserted in corresponding slots of the rib mounting 3. They can be individually exchanged if required. The ribs 4 are shaped to enhance flow dynamics in the one 5 in order to present a low resistance to the composition entering at inlet A.

The ribs 4 are equipped with cross slots so that the pins 6 are formed, having, for example, a square or hexagonal cross section. The pins 6 are optionally again slotted on exhibit additional notches 7. The ribs 4 and the pins 6 form, during throughflow of the extrusion composition from the inlet side A to the outlet side B, the catalyst 10 (FIGS. 3 and 4) with parallel hollow channels 11.

The ribs 4 are advantageously produced by countersinking electromachining (filament electromachining). However, it is also possible to use extrusion units in correspondence with DOS 22 54 563 or DOS 22 22 468. Advantageously, though, the die is herein composed of several disks to ensure individual exchangeability, for example in case of wear and tear. The extrusion dies are made of hard ceramic or steel.

FIG. 3 illustrates an extruded catalyst molding 10 produced by means of an extrusion die 1. The parallel hollow channels 11 can exhibit additional ribs 12, or they can be designed to be smooth-walled (detail B in FIG. 4). The extrusion dies can optionally be heated or cooled entirely or partially. By a suitable temperature effect, the molding can obtain an initial strength as early as in the extrusion die. Advantageously, the die is followed by a calibrating member. In case of temperature-sensitive compositions, the rough body is first prehardened in the calibrating unit by the effect of temperature. The initial zone of the calibration is in this case designed to be coolable in order to prevent the hardening process of the rough body within the die. In case of the use of cooled and heated zones in the extrusion die and/or in the calibrating zone, a heat barrier is preferably to be provided.

FIG. 5 shows an extrusion die 20 in disk construction for an automobile catalyst, from the inlet side, in a sectional view, and from the outlet side. The disks 21, having a shape advantageous for flow dynamics, can be individually exchanged.

FIG. 6 shows a casting mold 30 for the manufacture of cast catalyst moldings. A relatively large number of preferably conically tapering mold inserts 32 are inserted in the base member 31; these mold inserts form the subsequent hollow channels of the cast catalyst 40. The mold inserts 32 can be designed preferably to have a honeycomb shape, but they can also exhibit an irregular surface.

FIG. 7 illustrates the cast molding 40 in a plan view and in a cross-sectional view.

EXAMPLE 1

A potassium-alkaline silicate solution, prepared by dissolving precipitated silicic acid in potassium, hydroxide solution, with a molar ratio of 1.8 $SiO_2$/1 $K_2O$ and 43% by weight water content, is added in a continuous mixing apparatus in metered amounts to a solid premix of 40% by weight of furnace filter dust from corundum manufacture (containing about 9% by weight of $SiO_2$ and about 87% by weight of $Al_2O_3$), 40% by weight of $Al(OH)_3$ and 20% by weight of quartz powder, and the resultant mixture, containing about 30% by weight of the silicate solution, is deaerated by vacuum in a screw extruder, then extruded through a multiple-hole die; the strength of the rough molding is increased by IR radiators, and the resultant molding is hardened at 85° C.

By baking with stepwise temperature increase to 1200° C., temperature-resistant moldings are produced which are subsequently provided with a wash coat in a conventional way and which are doped with catalyst material. The catalyst material is platinum and is on the surfaces of the hollow channels in an amount of 0.01 to 0.1%, based on the weight of the molded body.

EXAMPLE 2

A mixture according to Example 1, but with an increased water content of 36% by weight, is shaped with the aid of a casting mold, initially hardened by exposure to heat, finally hardened at 3 bar in a steam atmosphere, and subsequently baked as described in Example 1.

EXAMPLE 3

Furnace filter dust from mullite manufacture with about 20% by weight of $SiO_2$ content and about 75% by weight of $Al_2O_3$ content, in an amount of 2 kg, is mixed homogeneously with 2 kg of calcined bauxite and 1 kg of talc and kneaded into a homogeneous composition with 2 kg of a potassium-alkaline silicate solution with 50% by weight solids content and with a molar ratio of $SiO_2$:$K_2O$ of 1.5:1, finally combined with 0.3% by weight of hydrogen peroxide, and forced through a multiple-hole die. Under spontaneous heating, a slightly expanded molding is produced with an enlarged surface area in the walls of the channels; this molding, after hardening at 60° C. into a ceramic body, is baked at temperatures of 1,450° C.

EXAMPLE 4

The foamed molding according to Example 3 is hardened at 60° C. and thereafter impregnated with a catalyst solution and baked at temperatures of 900° C. The catalyst material is the same as in Example 1 and present in the same amount as in Example 1.

EXAMPLE 5

Furnace filter dust from corundum manufacture, containing 8% by weight of amorphous $SiO_2$, 89% by weight of $Al_2O_3$, and small amounts of crystalline $SiO_2$, $Fe_2O_3$, and alkali oxides is homogeneously mixed in an amount of 2 kg with 1.5 kg of calcined $Al_2O_3$ and 1 kg of talc as well as 0.4 kg of a catalyst, and then thoroughly kneaded under cooling with 2 kg of a solution of amorphous, precipitated silicon dioxide in a potassium hydroxide solution with a molar ratio of $SiO_2$:$K_2O$ of 1.75:1, and with a water content of about 45%. The homogenized composition is shaped into a rod and cut into granules, then hardened within about 30 minutes at 80° C. If the water content is increased, a molding composition lending itself to casting is produced.

EXAMPLE 6

Furnace filter dust from mullite production, containing 56% by weight of $Al_2O_3$ and 38% by weight of largely amorphous $SiO_2$ besides small proportions of other heavy metal and alkali metal oxides, is mixed in an amount of 1.5 kg homogeneously with 2 kg of $Al(OH)_3$ and 1 kg of talc, kneaded under cooling with 1.5 kg of a potassium-alkaline potassium silicate solution with a solids content of 50% by weight and a molar ratio of 1.5 $SiO_2$:1 $K_2O$, then shaped, likewise under cooling, in an extruder with a die according to FIGS. 1/2 into moldings provided with channels and, after a brief infrared prehardening step, hardened in an autoclave under a steam pressure of 3 bar within about 10 minutes and subsequently doped with a catalyst (i.e. copper-chromite or other copper compound) as described in Example 1. On account of the larger surface area, the catalyst effect is improved over that of Example 5. The composition to be shaped can also selectively be combined with a catalyst material in amounts of 0.01–0.3 kg.

EXAMPLE 7

A premix is prepared from 0.5 kg of furnace filter dust as in Example, 5, with 1.5 kg of finely ground calcined bauxite, 1 kg of quartz powder, and 0.5 kg of talc, as well as 0.2 kg of a catalyst material (i.e. copper-chromite), then kneaded under cooling together with a solution according to Example 5 in an amount of 3.8 kg, shaped into granules, and briefly hardened at 50° C.

We claim:

1. A molded catalyst comprising catalytically active material for influencing chemical reaction homogeneously distributed in an inorganic molding or the catalytically active material applied to the surface of an inorganic molding, said molding being produced from a press-moldable or flowable molding composition of
   (a) an oxide mixture with contents of amorphous $SiO_2$ and aluminum oxide and/or
   (b) electrostatic precipitator ash from high-temperature coal-burning power plants and/or
   (c) calcined ground bauxite, in amounts of 0.5–4.0 parts by weight of the finely divided components (a) through (c) per part by weight of an alkali silicate solution containing 1.2–2.5 moles of dissolved $SiO_2$ per mole of $K_2O$ or, respectively, $Na_2O$, by pouring the composition into a mold or, respectively, press-molding or extrusion and hardening of the molding composition at temperatures of 50°–95° C.

2. A catalyst according to claim 1, containing 0.5–25 parts by weight of the catalytic active material, based on 100 parts by weight of solids content of the molding.

3. A catalyst according to claim 1, said molding containing hollow channels that extend essentially in parallel to one another.

4. A catalyst according to claim 2, said molding containing hollow channels that extend essentially in parallel to one another.

5. A catalyst according to claim 3, wherein said molding contains 1–500 hollow channels/100 cm² cross-sectional area.

6. A catalyst according to claim 1, wherein said molding is in the shape of a granule or a pellet.

7. A catalyst according to claim 2, wherein said molding is in the shape of a granule or a pellet.

8. A catalyst according to claim 1, wherein said molding comprises a foam material having pores therein.

9. A catalyst according to claim 1, wherein said molding contains hollow channels produced by rod extrusion with the aid of extrusion dies.

10. A catalyst according to claim 1, further being characterized resulting from the absence of free water, by an elevated temperature treatment at 100°–550° C. in the air or an inert gas and/or baking after the hardening.

11. A process for the production of molded catalysts which comprises preparing an aqueous, inorganic molding composition, having a catalytic active material for influencing chemical reactions therein from an admixture containing
    (a) an oxide mixture with contents of amorphous $SiO_2$ and aluminum oxide and/or
    (b) electrostatic precipitator ash from high-temperature coal-burning power plants and/or
    (c) calcined ground bauxite, in amounts of 0.5–4.0 parts by weight of the finely divided components (a) through (c) per part by weight of an alkali silicate solution containing 1.2–2.5 moles of dissolved $SiO_2$ per mole of $K_2O$ or, respectively, $Na_2O$, and the catalytic active material; press-molding or extruding or pouring the admixture in the flowable condition into a mold, and hardening at temperatures of 50°–95° C.

12. A process according to claim 11, characterized in that hardening takes place under pressures of 2–5 bar.

13. A process according to claim 11, characterized by providing an elevated temperature treatment at 100°–550° C. in the air inert gas after hardening at 50°–95° C. after the hardening.

14. A process according to claim 12, characterized by providing an elevated temperature treatment at 100°–550° C. in the air or an inert gas after hardening at 50°–95° C. after the hardening.

15. A process according to claim 11, characterized by baking at temperatures of 600°–1,550° C. after the hardening.

16. A process according to claim 12, characterized by baking at temperatures of 600°–1,500° C. after the hardening.

17. A process according to claim 11, characterized by using a potassium-alkaline potassium silicate solution as the alkali silicate solution.

18. A process for the production of catalysts according to claim 11, characterized in that a molding having essentially mutually parallel hollow channels is produced from the molding composition by the method of rod extrusion, is divided into sections and the sections are dried, and then hardened.

19. A process according to claim 18, characterized by using an extrusion die, containing ribs and subsequently disposed pins, during the shaping step.

20. A catalyst according to claim 1, wherein said molding composition further contains finely divided inert fillers including quartz powder, quartz sand, aluminum oxide, aluminum hydroxide, magnesium oxide, magnesium hydroxide or talc.

21. A catalyst according to claim 3, wherein said molding contains 20–100 hollow channels/cm² cross-sectional area.

22. A process according to claim 11, characterized in that hardening takes place under pressures of 2–5 bar in a steam atmosphere.

23. A process according to claim 11, characterized in that the admixture contains finely divided inert fillers including quartz powder, quartz sand, aluminum oxide, aluminum hydroxide, magnesium oxide, magnesium hydroxide or talc.

* * * * *